(12) United States Patent
Oh et al.

(10) Patent No.: US 10,095,224 B2
(45) Date of Patent: Oct. 9, 2018

(54) ETHERCAT CONTROL DEVICE AND FACTORY AUTOMATION SYSTEM HAVING THE SAME

(71) Applicant: SAMSUNG ELECTRONICS CO., LTD., Suwon-si (KR)

(72) Inventors: Kyoung-Whan Oh, Suwon-si (KR); Jang-Hyoun Youm, Suwon-si (KR); Jae-Hyun Kim, Seoul (KR); Eun-Kyung Hong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 655 days.

(21) Appl. No.: 14/528,633

(22) Filed: Oct. 30, 2014

(65) Prior Publication Data

US 2015/0248126 A1    Sep. 3, 2015

(30) Foreign Application Priority Data

Mar. 3, 2014 (KR) .......................... 10-2014-0025150

(51) Int. Cl.
| | |
|---|---|
| *G05B 19/18* | (2006.01) |
| *G05B 19/418* | (2006.01) |
| *H04L 12/403* | (2006.01) |
| *H04J 3/06* | (2006.01) |

(52) U.S. Cl.
CPC .......... *G05B 19/418* (2013.01); *H04J 3/0667* (2013.01); *H04L 12/403* (2013.01); *Y02P 90/14* (2015.11); *Y02P 90/18* (2015.11); *Y02P 90/185* (2015.11)

(58) Field of Classification Search
CPC .................................................. G05B 19/418

USPC ........................................................ 700/1–27
See application file for complete search history.

(56) References Cited

U.S. PATENT DOCUMENTS

| | | | | |
|---|---|---|---|---|
| 3,502,882 A | * | 3/1970 | Von Voros ........... | B23Q 35/128 219/124.34 |
| 5,777,870 A | * | 7/1998 | Takaku ............... | G05B 19/4182 370/294 |
| 6,587,879 B1 | * | 7/2003 | Reynolds ............ | G06F 11/2294 700/26 |
| 7,248,986 B2 | * | 7/2007 | Klijn .................. | G01R 31/3272 307/11 |
| 7,412,344 B2 | * | 8/2008 | Chang .................... | H04L 43/50 324/555 |

(Continued)

FOREIGN PATENT DOCUMENTS

| | | |
|---|---|---|
| KR | 10-2010-0080191 A | 7/2010 |
| KR | 10-2011-0114869 A | 10/2011 |

OTHER PUBLICATIONS

Felser, Max. "Real-time ethernet-industry prospective." Proceedings of the IEEE 93.6 (2005): pp. 1118-1129.*

(Continued)

*Primary Examiner* — Satish Rampuria
(74) *Attorney, Agent, or Firm* — Sughrue Mion, PLLC

(57) ABSTRACT

An EtherCAT control device and a factory automation system having the same are provided. The EtherCAT control device includes a master including a dummy EtherCAT slave controller (ESC) and a first slave configured to communicate data with the master according to an EtherCAT protocol, such that the master synchronizes a timing with the first slave according to a precision time protocol (PTP) method using the dummy ESC.

15 Claims, 11 Drawing Sheets

(56) References Cited

U.S. PATENT DOCUMENTS

| | | | | |
|---|---|---|---|---|
| 7,526,405 | B2* | 4/2009 | Miller | G05B 23/024 |
| | | | | 382/144 |
| 7,656,751 | B2 | 2/2010 | Rischar et al. | |
| 7,848,825 | B2* | 12/2010 | Wilson | G06F 3/0416 |
| | | | | 345/173 |
| 8,265,101 | B2 | 9/2012 | Cho | |
| 2002/0138156 | A1* | 9/2002 | Wong | G06F 9/4405 |
| | | | | 700/8 |
| 2009/0016475 | A1* | 1/2009 | Rischar | H04J 3/0697 |
| | | | | 375/356 |
| 2010/0166022 | A1* | 7/2010 | Cho | G05B 19/41815 |
| | | | | 370/503 |
| 2010/0179673 | A1* | 7/2010 | Muroi | G11B 27/10 |
| | | | | 700/94 |
| 2011/0170534 | A1* | 7/2011 | York | H04J 3/0667 |
| | | | | 370/350 |

OTHER PUBLICATIONS

Vyatkin, Valeriy. "IEC 61499 as enabler of distributed and intelligent automation: State-of-the-art review." IEEE Transactions on Industrial Informatics 7.4 (2011): pp. 768-781.*

Prytz, Gunnar. "A performance analysis of EtherCAT and PROFINET IRT." Emerging Technologies and Factory Automation, 2008. ETFA 2008. IEEE International Conference on. IEEE, 2008. pp. 408-415.*

Moon, et al.; "The Study on Distribution Clock Synchronization of EtherCAT Communication System", Journal of Korean Institute of Electronic Communication Sciences, Nov. 2009, vol. 4, No. 4, 8 pages total.

"EtherCAT Slave Controller Hardware Data Sheet", Version 2.1, Mar. 1, 2013, http://www.beckhoff.com, 113 pages total.

* cited by examiner

<u>10</u>

ETHERCAT CONTROL DEVICE AND FACTORY AUTOMATION SYSTEM HAVING THE SAME

CROSS-REFERENCE TO RELATED APPLICATION

This application claims priority under 35 U.S.C. § 119 to Korean Patent Application No. 10-2014-0025150 filed on Mar. 3, 2014, the entire contents of which are incorporated herein by reference in their entirety.

BACKGROUND

1. Field

Exemplary embodiments relate to an EtherCAT control device, and more particularly, to an EtherCAT control device that may synchronize the timing between a master and a slave and a factory automation system having the same.

2. Description of Related Art

Owing to a development of communication technology, a convenience of installment and a cost reduction, a plurality of devices may be connected with each other through a network.

An Ethernet for Control Automation Technology (Ether-CAT) network is a kind of industrial Ethernet. The Ether-CAT network has an updating function with respect to high speed data and controls the timing synchronization among the devices. Generally, the EtherCAT network consists of a master and a plurality of slaves.

SUMMARY

Embodiments of the inventive concept provide an EtherCAT control device capable of synchronizing the timing between a master and a slave.

Exemplary embodiments also provide a factory automation system including the EtherCAT control device.

The technical objectives of the exemplary embodiments are not limited to the above disclosure; other objectives may become apparent to those of ordinary skill in the art based on the following descriptions.

In accordance with an aspect of an exemplary embodiment, an EtherCAT control device includes a master configured to include a dummy EtherCAT Slave Controller (ESC) and a first slave configured to perform data communication with the master according to an EtherCAT protocol, wherein the master synchronizes a timing with the first slave according to a precision time protocol (PTP) method using the dummy ESC.

According to one exemplary embodiment, the EtherCAT control device may further include a second slave configured to communicate data with the master according to the EtherCAT protocol, where the first slave and the second slave include an ESC, and each of the first slave and second slave synchronize the timing with each other using each the corresponding ESC according to the PTP method.

In another exemplary embodiment, the first slave operates as a time master and each of the master and the second slave operates as a time slave.

In still another exemplary embodiment, the first slave controls a first motor corresponding to a first axis of a robot and the second slave controls a second motor corresponding to a second axis of the robot.

In yet another exemplary embodiment, the dummy ESC performs a drive preparation operation by itself, and the drive preparation operation may include an initializing operation, a safety operating operation, a pre-operating operation, and an operating operation.

In yet another exemplary embodiment, the master may further include a digital signal processor (DSP) configured to execute the drive preparation operation of the dummy ESC.

In yet another exemplary embodiment, the master may further include a central processing unit (CPU) operated according to an operation system, and the operation system does not include a Real-Time Operation System.

In yet another exemplary embodiment, the PTP method observes a protocol prescribed by Institute of Electrical and Electronics Engineers (IEEE) 1588.

In yet another exemplary embodiment, the master further including a master clock generator configured to generate a master clock, where the master transfers an operational command in synchronization with the master clock to the first slave or the second slave.

In accordance with another aspect of an exemplary embodiment, a factory automation system may include a robot having first motor mounted to a first axis and a second motor mounted to a second axis and an EtherCAT control device configured to control the robot, where the EtherCAT control device includes a master configured to include a dummy EtherCAT Slave Controller (ESC) and a first slave configured to perform data communication with the master according to an EtherCAT protocol, where the master synchronizes a timing with the first slave according to a PTP method using the dummy ESC.

In an exemplary embodiment, a factory automation system may further include a second slave configured to communicate data with the master according to the EtherCAT protocol, where each of the first slave and the second slave may include an ESC, wherein each of the first slave and the second slave synchronize the timing with each other using the corresponding ESC according to the PTP method.

In another exemplary embodiment, the first slave controls the first motor in response to a first operational command from the master and the second slave controls the second motor in response to a second operational command from the master.

In still another exemplary embodiment, the first slave operates as a time master and each of the master and the second slave operates as a time slave.

In yet another exemplary embodiment, the master may further include a CPU operated according to an operation system, and the operation system does not include a Real-Time Operation System.

In yet another exemplary embodiment, the dummy ESC performs a drive preparation operation, where the drive preparation operation may include an initializing operation, a safety operating operation, a pre-operating operation, and an operating operation.

According to another exemplary embodiment, there is provided a method of controlling an EtherCAT control device, the method including communicating data from a master, which includes a dummy EtherCAT slave controller (ESC), with a first slave, and synchronizing a timing with the first slave according to a precision time protocol (PTP) method using the dummy ESC.

The communicating may include communicating data from the master to a second slave, and the synchronizing may include synchronizing the timing between the first slave and the second slave through corresponding ESC according to the PTP method.

The method may further include performing a drive preparation operation by the dummy ESC, wherein the drive preparation operation may include an initializing operation, a safety operating operation, a pre-operating operation, and an operating operation.

The method may further include generating a master clock by the master, and transferring an operational command by the master from the first slave to the second slave in synchronization with the master clock.

BRIEF DESCRIPTION OF THE DRAWINGS

The foregoing and other features and advantages of the inventive concepts will be apparent from the more particular description of exemplary embodiments, as illustrated in the accompanying drawings in which like reference characters refer to the same parts throughout the different views. The drawings are not necessarily to scale, emphasis instead being placed upon illustrating the principles of the exemplary embodiments. In the drawings.

DETAILED DESCRIPTION

Figure 1:
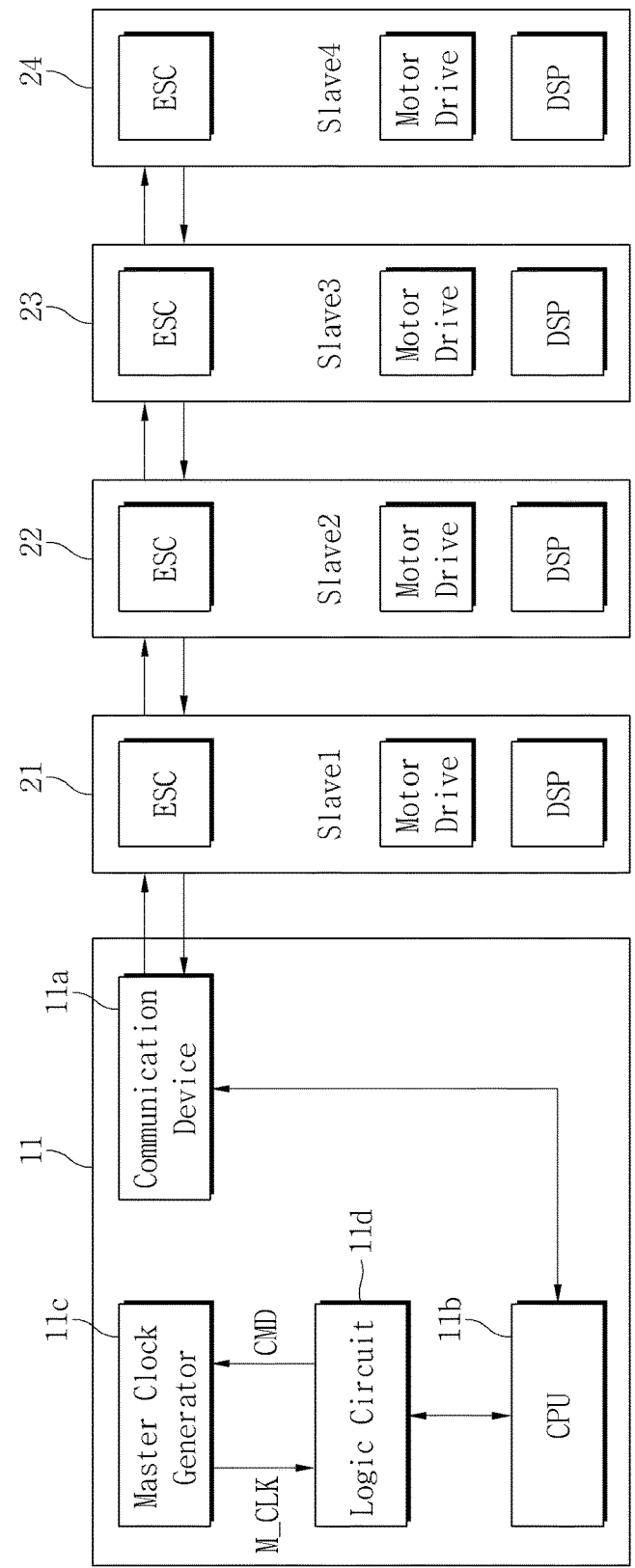
FIG. 1 is a block diagram illustrating a related art EtherCAT control device.

Exemplary embodiments are described below in sufficient detail to enable those of ordinary skill in the art to embody and practice the present invention. It is important to understand that the present invention may be embodied in many alternate forms and should not be construed as limited to the exemplary embodiments set forth herein.

It will be understood that, although the terms "first", "second", "A", "B", etc. may be used herein in reference to elements of the invention, such elements should not be construed as limited by these terms. For example, a first element could be termed a second element, and a second element could be termed a first element, without departing from the scope of the exemplary embodiments. Herein, the term "and/or" includes any and all combinations of one or more referents.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.).

The terminology used herein to describe the exemplary embodiments is not intended to limit the scope of the invention. The articles "a," "an," and "the" are singular in that they have a single referent, however the use of the singular form in describing the exemplary embodiments should not preclude the presence of more than one referent. In other words, elements of the invention referred to as singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

Meanwhile, when it is possible to implement any exemplary embodiment in any other way, a function or an operation specified in a specific block may be performed differently from a flow specified in a flowchart. For example, two consecutive blocks may actually perform the function or the operation simultaneously, and the two blocks may perform the function or the operation conversely according to a related operation or function.

Exemplary embodiments will be described below with reference to attached drawings.

FIG. 1 is a block diagram illustrating a related art EtherCAT control device.

Referring to FIG. 1, an EtherCAT control device 10 includes a master 11 and first to fourth slaves 21 to 24, respectively. The master 11 may transfer data according to an EtherCAT protocol to each of the first to fourth slaves 21 to 24. Further, the master 11 may receive data according to the EtherCAT protocol from each of the first to fourth slaves 21 to 24. The first to fourth slaves 21 to 24 may control four axes of a robot, respectively. According to the exemplary embodiment, the first to fourth slaves 21 to 24 are illustrated, but the number of slaves is not limited thereto.

The master 11 includes a communication device 11a capable of transferring or receiving data according to the EtherCAT protocol, a central processing unit (CPU) 11b including an operating system (OS) for operating the EtherCAT control device 10, a master clock circuit 11c configured to generate a master clock M_CLK used when transferring an operational command CMD to the first to fourth slaves 21 to 24 and a logic circuit 11d configured to execute an interrupt to the CPU 11b in synchronization with the master clock M_CLK.

According to the exemplary embodiment, the communication device 11a may be implemented as a local area network (LAN). The master clock circuit 11c may be implemented by ATMEGA AVR. The logic circuit 11d may be implemented by PCI9030. An industrial robot may be operated through controlling a motor installed in each of the axes of the industrial robot.

Each of the first to fourth slaves 21 to 24 includes a motor drive configured to operate a motor connected to an axis, a digital signal processor (DSP) configured to control the motor drive, and an EtherCAT Slave Controller (ESC) configured to transfer and receive data according to the EtherCAT protocol. A method of synchronizing the timing between a master and a slave will be described through FIG. 2.

Figure 2:
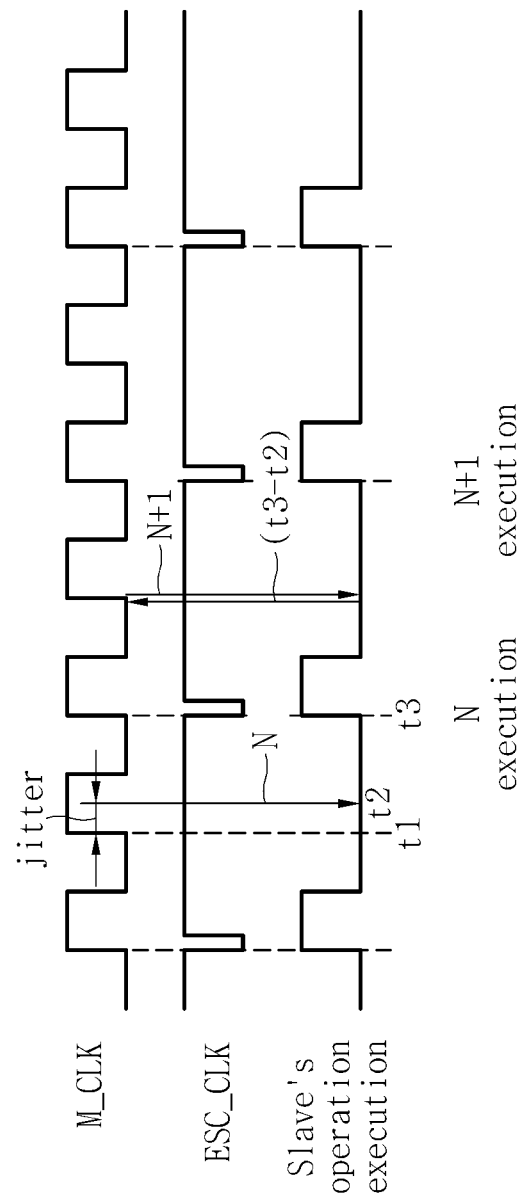
FIG. 2 is a timing diagram for describing a method of synchronizing the timing between a master and a slave in the EtherCAT control device 10 shown in FIG. 1.

FIG. 2 is a timing diagram for describing a method of synchronizing the timing between a master and a slave in the EtherCAT control device 10 shown in FIG. 1.

Referring to FIGS. 1 and 2, the master clock circuit 11c may generate a master clock M_CLK having a period of 500 μsec. The CPU 11b may correct the period of the master clock M_CLK to synchronize the timing with the first to fourth slaves 21 to 24.

Specifically, the master 11 transfers an operational command to one of the first to fourth slaves 21 to 24 in synchronization with an even numbered rising edge in the master clock M_CLK.

For example, in t1 time, the master 11 may transfer an operational command N to one of the first to fourth slaves 21 to 24 in synchronization with an even numbered rising edge in the master clock M_CLK.

In t2 time, the first slave 21 receives the operational command N. But the operational command N may have a delay (i.e. t2−t1) from an even numbered rising edge to t2 time by jitter. At this moment, the first slave 21 stores time information (i.e. t2) received the operational command N and time difference (i.e. t3−t2) information between the t2 time and the next slave synchronization time (i.e. t3).

The first slave 21 may generate an ESC clock signal ESC_CLK having a 1 msec period using an ESC. The first slave 21 transfers the time difference (i.e. t3−t2) information to the master 11 when a next operational command N+1 is transferred.

In order to constantly maintain the time difference (i.e. t3−t2) as 500 μsec, the period of the master clock M_CLK may be extended or be shortened by the master 11. Accordingly, the master 11 may synchronize the timing between the master clock M_CLK and the ESC clock ESC_CLK as a reference time for the first slave 21. Further, the EtherCAT control device 10 may remove the jitter effect.

Figure 3:
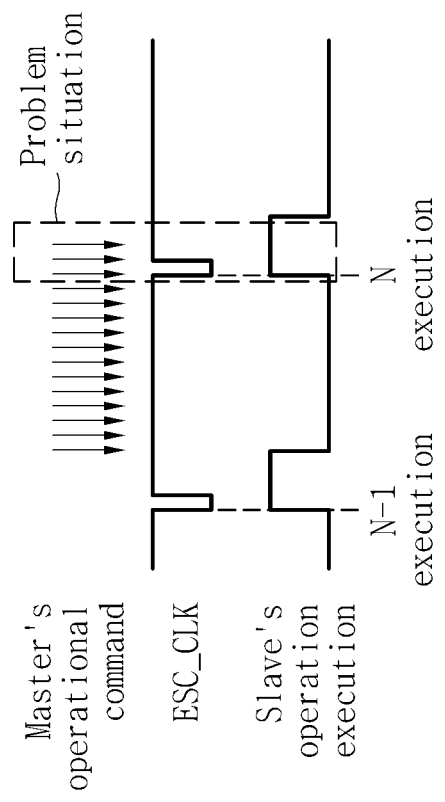
FIG. 3 is a conceptual diagram for describing the problem shown in FIG. 2.

FIG. 3 is a conceptual diagram for describing the problem shown in FIG. 2.

Referring to FIGS. 1 to 3, a related art method of synchronizing the timing between the master 11 and the first slave 21 may have a timing jitter of about ±600 μsec. In this case, there is no problem in communication between a master and a slave that have a 16 msec period. On the contrary, recently, a communication period between a master and a slave is reduced to 1 msec for high-speed and precise control. To solve this problem, the method shown in FIG. 2 may not be used.

For example, when the first slave 21 receives an operational command N from the master 11, if a transmission of the operational command N by the master 11 is late, a problem occurs in the motor operation of a robot. This is because the first slave 21 does not receive the operational command N before the first slave 21 executes an operation.

Figure 4:
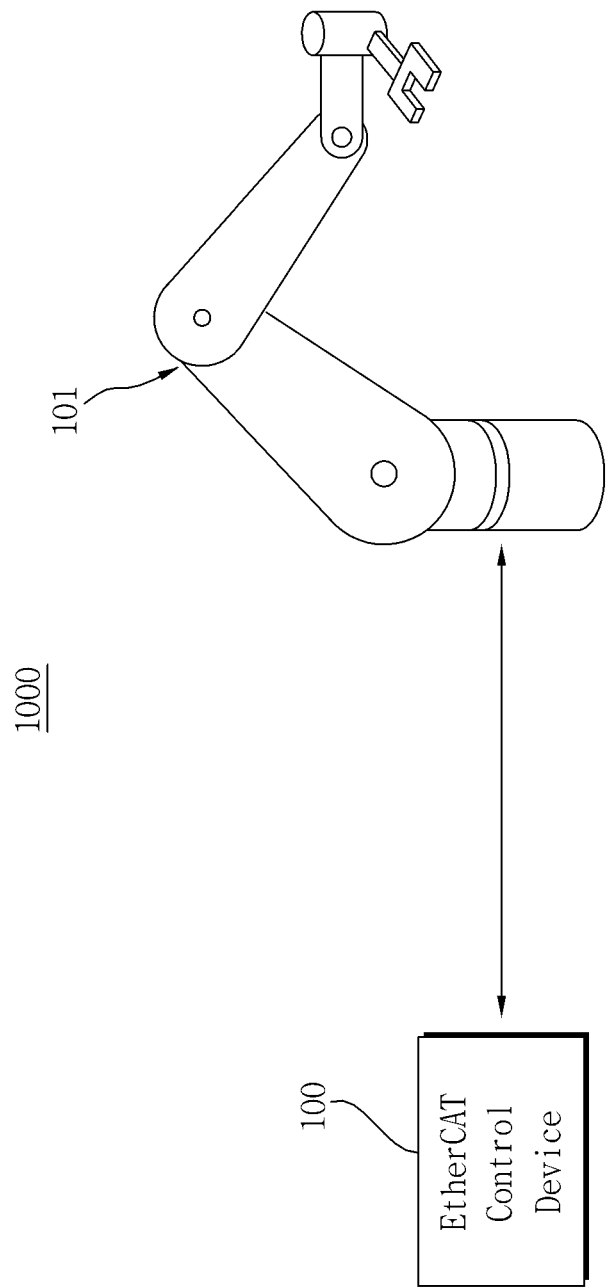
FIG. 4 shows a factory automation system according to an exemplary embodiment.

FIG. 4 shows a factory automation system according to an exemplary embodiment.

Referring to FIG. 4, the factory automation system 1000 according to the exemplary embodiment includes an EtherCAT control device 100 and an industrial robot 101.

The industrial robot 101 may operate through an operation of a motor installed in each axis. The EtherCAT control device 100 may control the motor installed in each axis. In the exemplary embodiment, the EtherCAT control device 100 may control the motor of the industrial robot 101 according to the EtherCAT protocol. The EtherCAT control device 100 will be described through FIG. 5 in detail.

Figure 5:
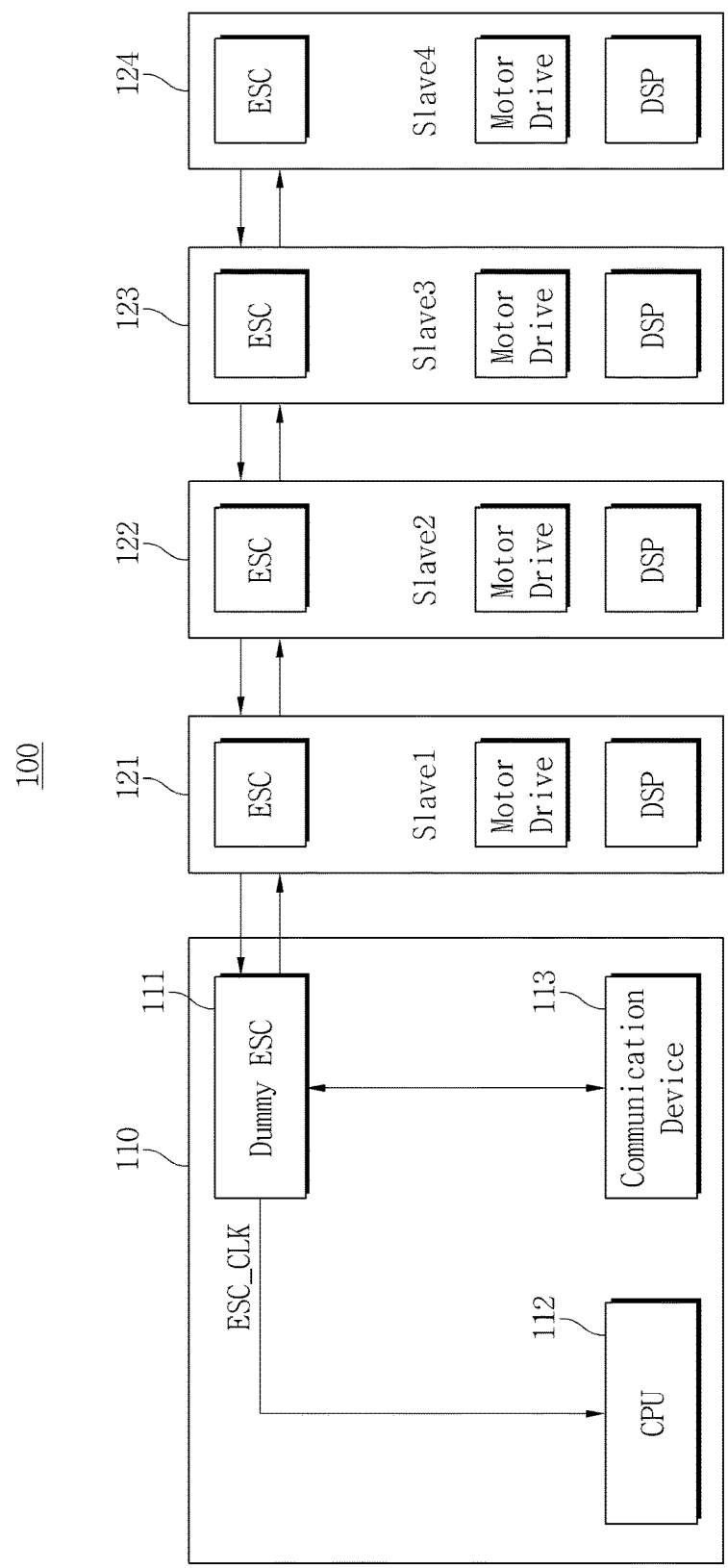
FIG. 5 is a block diagram illustrating an EtherCAT control device shown in FIG. 4.

FIG. 5 is a block diagram illustrating an EtherCAT control device shown in FIG. 4.

Referring to FIGS. 4 and 5, the EtherCAT control device 100 includes a master 110 and first to fourth slaves 121 to 124. The master 110 may transfer data according to the EtherCAT protocol to each of the first to fourth slaves 121 to 124. Further, the master 110 may receive data from each of the first and fourth slaves 121 to 124 according to the EtherCAT protocol. In the exemplary embodiment, the first to fourth slaves 121 to 124 are shown, but the number of slaves is not limited thereto.

The master 110 includes a dummy ESC 111, a CPU 112, and a communication device 113. The dummy ESC 111 may be implemented using the same ESC as an ESC included in each of the first to fourth slaves 121 to 124. In addition, the ESC has a clock function.

Generally, each of the first to fourth slaves 121 to 124 may synchronize timing according to a precision time protocol (PTP) method through the first to fourth salves 121 to 124 respective ESC. For example, when the slave 121 operates as a time master, each of the second to fourth slaves 122 to 124 operates as a time slave. The PTP method will be described through FIG. 6 in detail.

To synchronize the timing between the master 110 and the first to fourth slaves 121 to 124, the master 110 operates as the time slave. That is, the time master 110 may synchronize the timing with the time master according to the PTP method. A method of synchronizing the timing between the time master and a plurality of the time slaves is performed using the PTP method.

Generally, an ESC may perform a drive preparation operation to perform a normal operation. The drive preparation operation may include an initialization operation for initialization, a communication operation for preparation of safe operational operation, a pre-operational operation for confirming a read operation, and an operational operation for confirming a write operation. The dummy ESC 111 may perform the drive preparation operation by itself.

Further, to perform the drive preparation operation, the EtherCAT control device 100 may further include another chip, that is, a DSP. This exemplary embodiment will be described through FIG. 7.

The CPU 112 may communicate data with the first to fourth slaves 121 to 124 through the communication device 113. In one exemplary embodiment, the communication device 113 may include a LAN. The CPU 112 and the communication device 113 may be connected through a peripheral component interconnect (PCI) bus. The dummy ESC 111 and the communication device 113 may be connected through an EtherCAT. Each of the first to fourth slaves 121 to 124 further includes a motor drive configured to drive a motor operating the industrial robot 101 and a digital signal processor (DSP) configured to control the motor drive. Generally, a master operated by real-time operating system (RTOS) has a precise clock function. Accordingly, the master may synchronize timing with a plurality of slaves.

However, when the master 110 includes an OS without guaranteeing real-time, the EtherCAT control device 100 may synchronize the time between the master 110 and the first to fourth slaves 121 to 124 using the method shown in FIG. 2. Here, a clock period for data communication between the master 110 and the first to fourth slaves 121 to 124 is 1 msec, the data communication between the master 110 and the first to fourth slaves 121 to 124 can be affected by jitter because of low timing margin.

To solve this problem, the master 110 may synchronize the timing with the first slave 121 operating as a time master through the dummy ESC 111. Accordingly, the timing between an ESC clock ESC_CLK of the dummy ESC 111 and an ESC clock ESC_CLK of the first slave 121 may be synchronized. The master 110 may transfer an operational command to one of the first to fourth 121 to 124 in synchronization with the ESC clock ESC_CLK.

Figure 6:
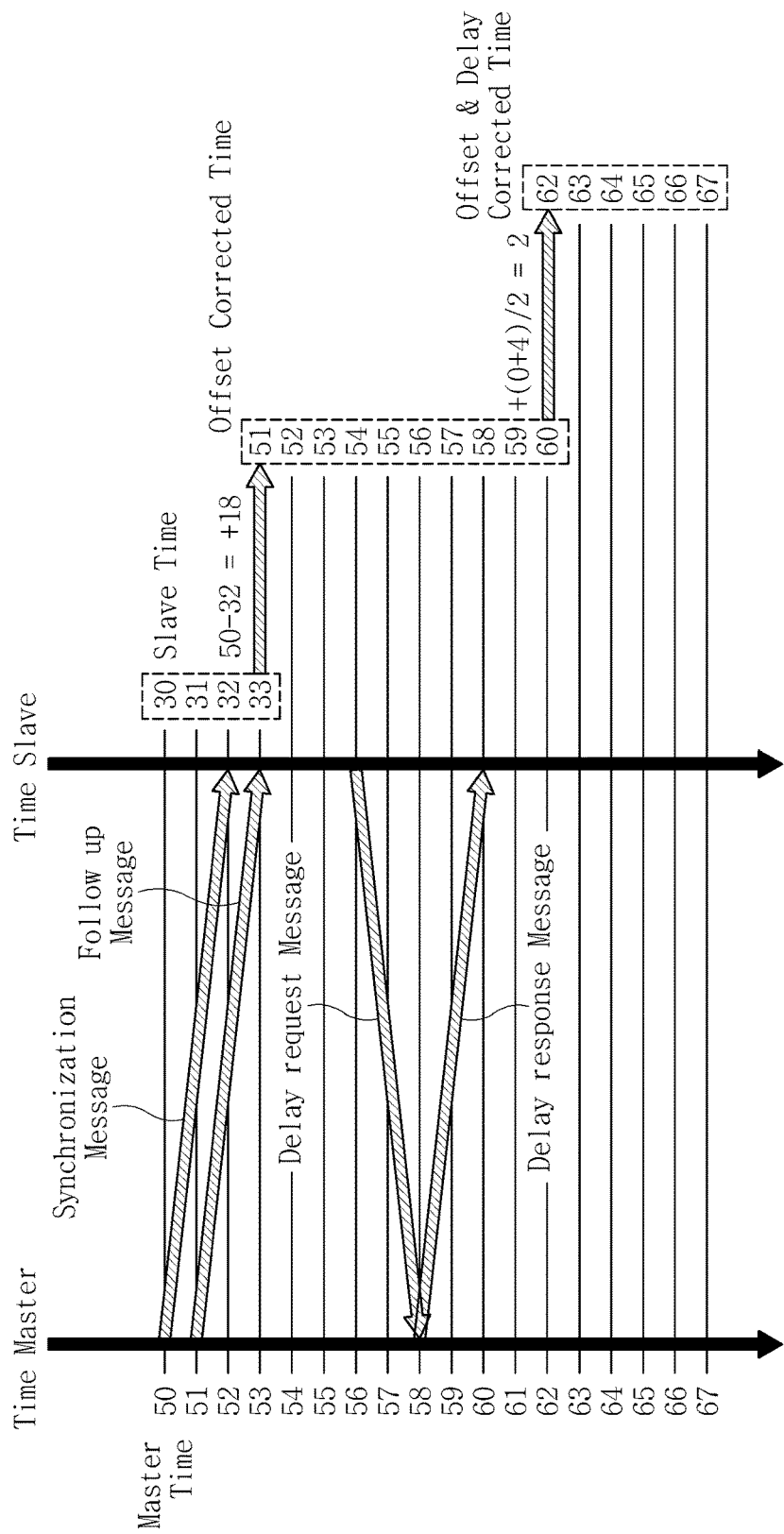
FIG. 6 is a conceptual diagram for explaining a synchronization process between the first to fourth slaves.

FIG. 6 is a conceptual diagram for explaining a synchronization process between the first to fourth slaves.

Referring to FIGS. 5 and 6, in a synchronization process among the first to fourth slaves 121 to 124, the first slave 21 operates as a time master and each of the second to fourth slaves 22 to 24 operates as a time slave. In the exemplary embodiment, the synchronization process among the first to fourth slaves 121 to 124 may include a precision time protocol (PTP) method. The PTP method includes a protocol prescribed by Institute of Electrical and Electronics Engineers (IEEE) 1588.

For example, the first slave 121 operates as a time master, the second slave 122 operates as a time slave. Each of the first and second slaves 121 and 122 has an inherent clock because they both include an ESC.

Master time is time of the time master (e.g. the first slave 121). Slave time is time of the slave master (e.g. the second slave 122).

At master time 50, the time master transfers a synchronization message to the time slave. At slave time 32, the time slave receives the synchronization message. When a communication overhead time is 0, the time slave may be determined that time difference between time master and the slave is 18 (i.e. 50−32).

To increase the accuracy of the determination of the time difference, the time master transfers a follow-up message having one master time difference from the synchronization message to the time slave. The time slave corrects the time difference. Specifically, the time slave changes slave time 50 into slave time 32 At slave time 51, the time slave receives the follow-up message.

To measure a communication overhead time, the time slave transfers a delay request message to the time master at slave time 54. The time master receives the delay request message and transfers a delay response message promptly to the time slave. The time slave receives the delay response message at slave time 58.

When the time master does not count the time from receiving the delay request message to transferring the delay response message promptly, the communication overhead time is 4 (i.e. 58−54). When the communication overhead time is divided in half, the communication overhead time is a one-way communication overhead time. Accordingly, the time slave adds 2 being the one-way communication overhead time to slave time. That is, the time slave changes slave time 60 into slave time 62.

A method of synchronizing the timing among slaves is using an ESC included in each of the slaves. According to an exemplary embodiment, a RTOS and an ESC have similar functions. Accordingly, a master including a RTOS performs a similar function such as an ESC.

However, when the master shown in FIG. 5 guarantees a real-time operation, the method of synchronizing the timing among the slaves may not be used. To solve this problem, the master 110 may include a dummy ESC 111.

That is, the EtherCAT control device 100 according to the exemplary embodiment may apply the PTP method used among slaves to the master 110 to synchronize the timing between the master 110 and the first to fourth slaves 121 to 124.

During synchronizing the timing among the first to fourth slaves 121 to 124, the master 110 may operate as a time slave using the dummy ESC 111. That is, when the first slave 121 operates as the time master, each of the second to fourth slaves 122 to 124 and the master 110 operates as a time slave. Through the PTP method, the master 110 may synchronize the timing among the first to fourth slaves 121 to 124.

Figure 7:
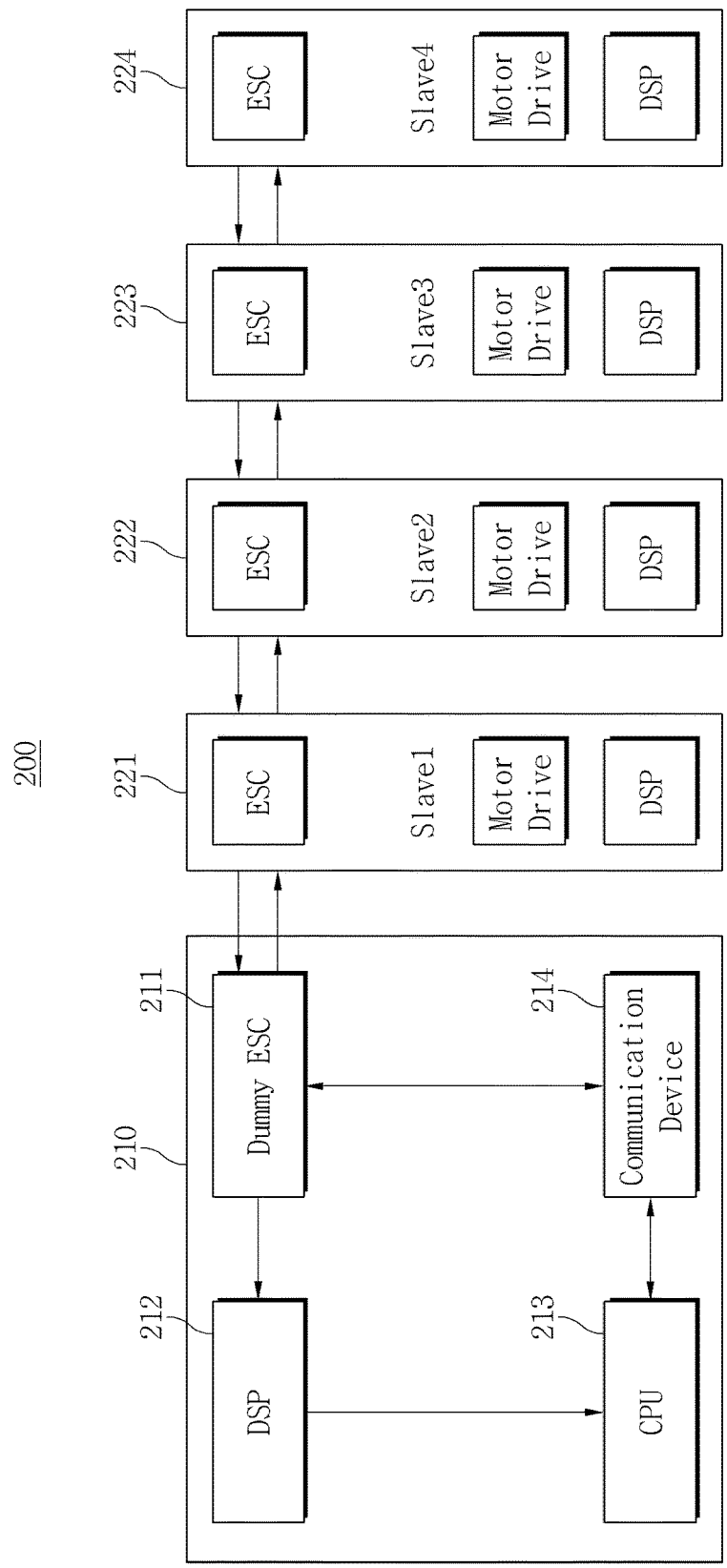
FIG. 7 is a block diagram illustrating an EtherCAT control device according to another exemplary embodiment.

FIG. 7 is a block diagram illustrating an EtherCAT control device according to another exemplary embodiment.

Referring FIG. 7, an EtherCAT control device 200 has a similar structure to the EtherCAT control device 100 shown in FIG. 5 except a DSP 212. Therefore, the description thereof will not be repeated.

In another exemplary embodiment, the master 210 may further include a DSP 212 configured to perform a drive preparation operation of a dummy ESC 211.

The DSP 212 may perform the drive preparation operation. Specifically, the DSP 212 may perform at least one from among an initialization operation for initialization, a communication operation for preparation of safe operational operation, a pre-operational operation for confirming a read operation, and an operational operation for confirming a write operation.

Figure 8:
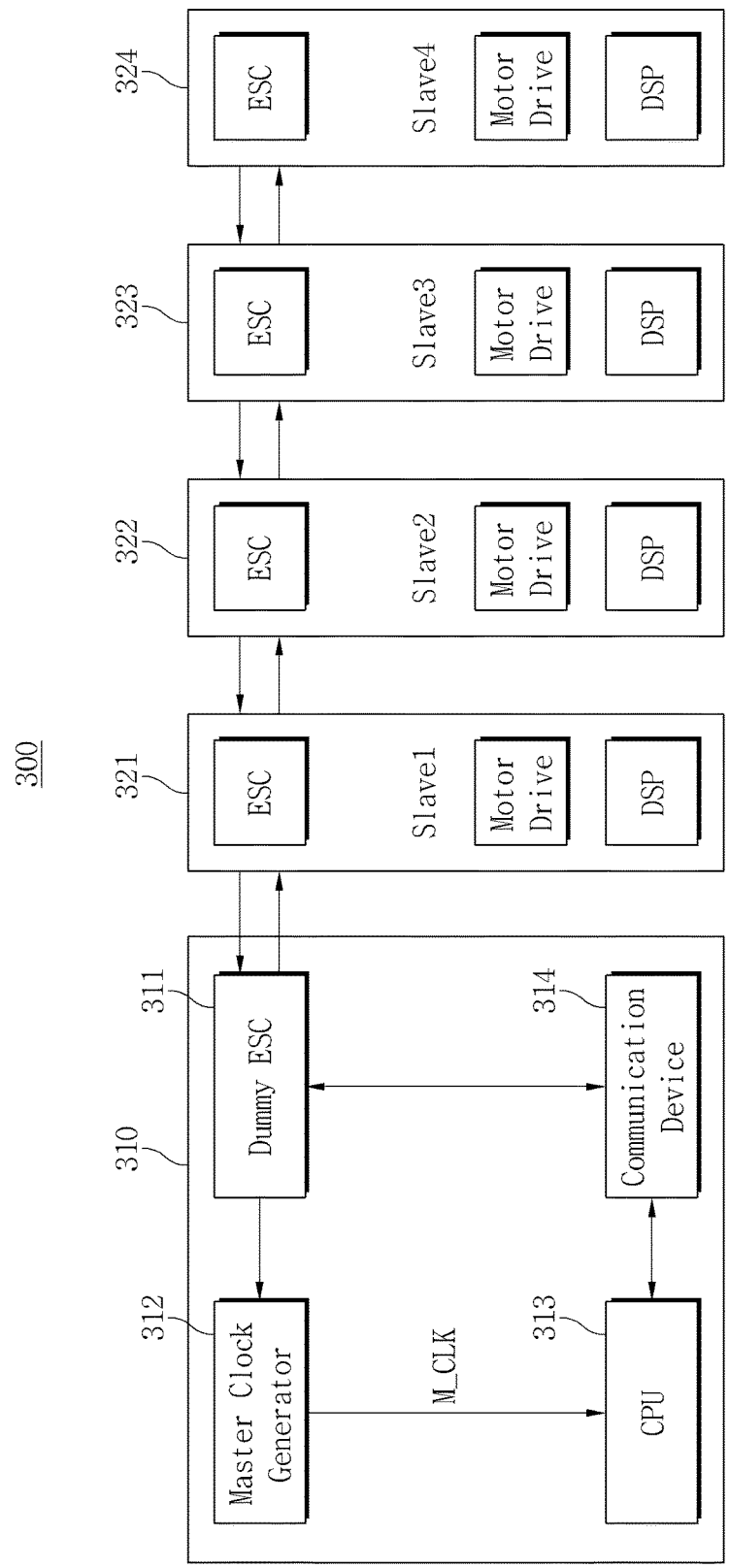
FIG. 8 is a block diagram showing an EtherCAT control device according to another exemplary embodiment.

FIG. 8 is a block diagram showing an EtherCAT control device according to another embodiment of the inventive concept.

Referring to FIG. 8, an EtherCAT control device 300 has a similar structure to the EtherCAT control device 100 shown in FIG. 5, except that the control device 300 includes a master clock generator 312. Therefore, the description thereof will not be repeated.

In another exemplary embodiment, the master clock generator 312 configured to generate a master clock M_CLK is included in the master 310.

Figure 9A:
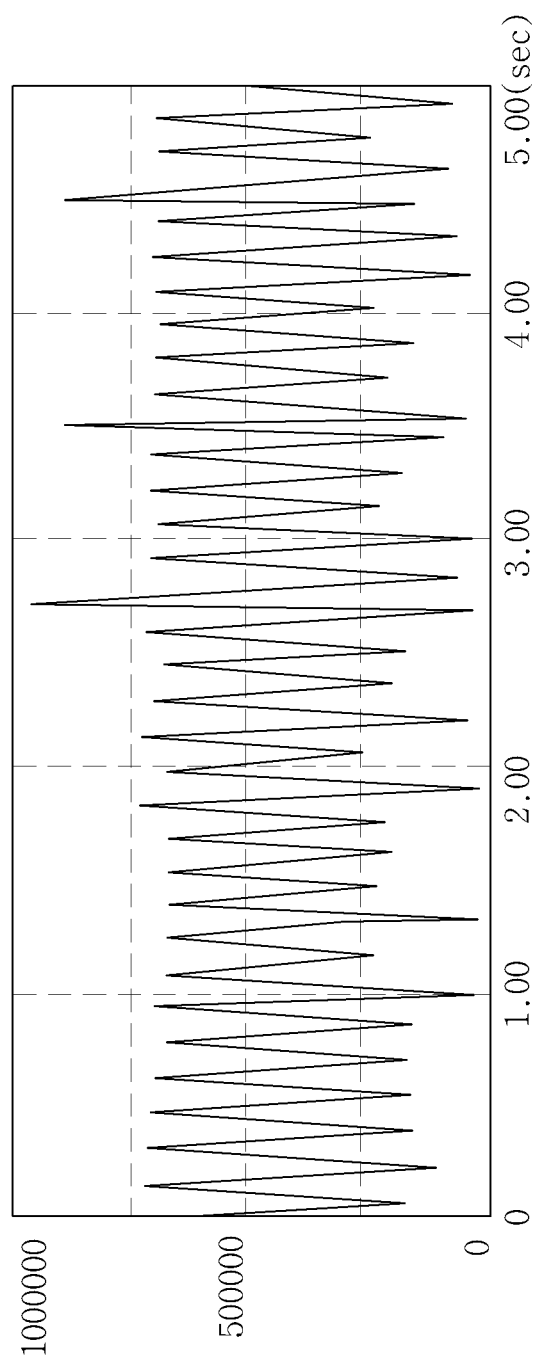
FIG. 9A is a graph showing synchronization jitter by a related art EtherCAT control device.

FIG. 9A is a graph showing synchronization jitter by a related art EtherCAT control device.

Referring to FIGS. 1, 2, and 9A, the abscissa is time and the ordinate is time difference. The time difference (i.e. t3−t2) is shown in FIG. 2.

Jitter by an EtherCAT control device 10, as shown in FIG. 1, may be generated by adding jitter from a synchronization clock (i.e. t2−t1) (0.5 μsec), jitter from an OS (about 150 μsec), and jitter by the communication device 11a (about 15 μsec). Jitter from the EtherCAT control device 10 shown in FIG. 1 is about 300 μsec. The jitter from the synchronization clock in a total amount of jitter is very small.

Figure 9B:
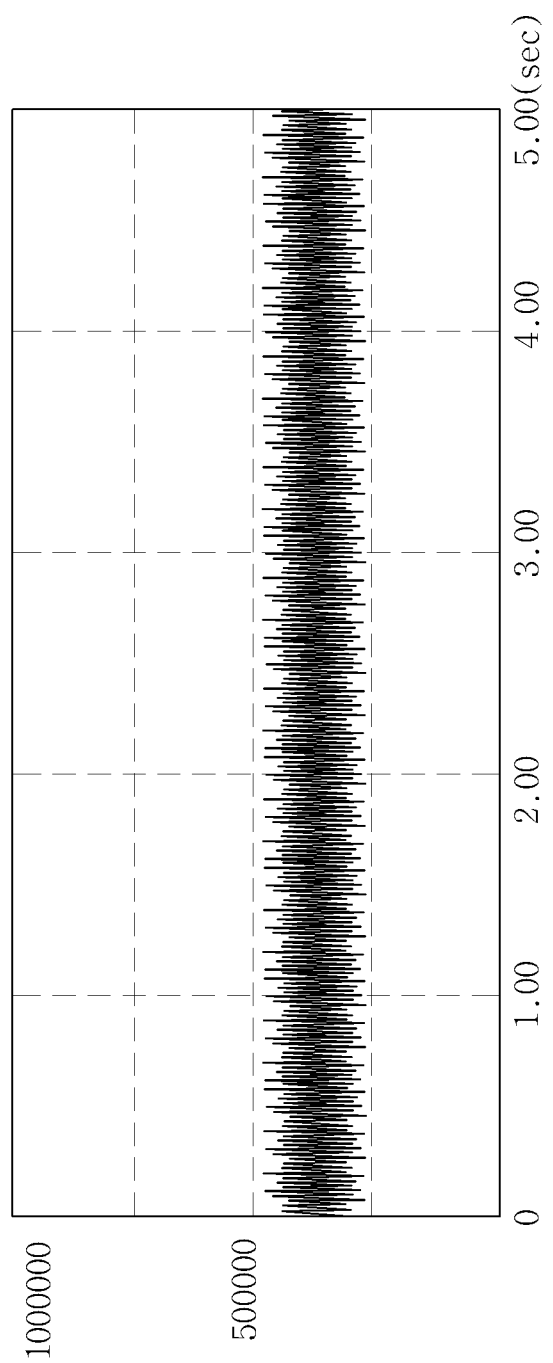
FIG. 9B is a graph showing synchronization jitter by the EtherCAT control device according to an exemplary embodiment.

FIG. 9B is a graph showing synchronization jitter by the EtherCAT control device according to an exemplary embodiment.

Referring to FIGS. 5 and 9A, the abscissa is time and the ordinate is a time difference. The time difference denotes (t3−t2) shown in FIG. 2.

Jitter by an EtherCAT control device 100 shown in FIG. 5 may be generated by adding jitter from a synchronization clock (0.5 μsec), jitter from OS (about 25 μsec), and jitter from the communication device 11a (about 2 μsec). Jitter by the EtherCAT control device 100 according to the exemplary embodiment is about 50 μsec. The total amount of jitter is reduced through a PTP method between a master and a slave.

Figure 10:
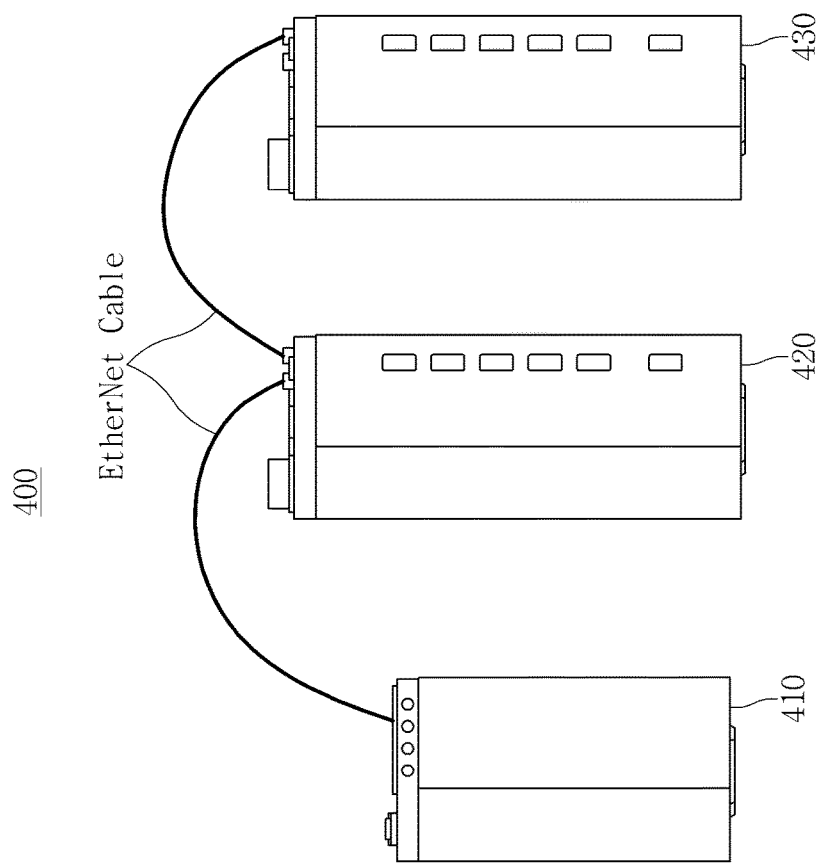
FIG. 10 shows an EtherCAT control device according to another exemplary embodiment.

FIG. 10 shows an EtherCAT control device according to another exemplary embodiment.

Referring to FIGS. 5 and 10, the EtherCAT control device 400 may include a master device 410, a first slave group 420, and a second slave group 430. In another exemplary embodiment, the EtherCAT control device 400 as illustrated includes two slave groups, but it is not limited thereto.

Each of the first and second slave groups 420 and 430 may include a plurality of slaves. For example, the first slave group 420 may include the first to fourth slaves 121 to 124 shown in FIG. 5.

The master device 410 and the first slave group 420 may be connected via the Ethernet cable. Likewise, the first slave group 420 and the second slave group 430 may be connected via the Ethernet cable.

The master device 410 may transfer an operational command to the first or second slave groups 420 or 430 through the Ethernet cable. In the exemplary embodiment, the master device 410 may be implemented as the master 110 shown in FIG. 5.

The exemplary embodiments may be applied to an EtherCAT control device and a factory automation system having the same.

The EtherCAT control device according to the exemplary embodiment includes a dummy EtherCAT slave controller and synchronizes the timing between a master and a slave through the dummy EtherCAT slave controller. Accordingly, the EtherCAT control device may prevent an error due to jitter in 1 ms operation.

The EtherCAT control device according to the exemplary embodiment includes a dummy EtherCAT slave controller (ESC) and synchronizes the timing between a master and a slave through the dummy ESC. Accordingly, the EtherCAT control device may prevent an error due to an effect of jitter in 1 ms operations.

The foregoing is illustrative of exemplary embodiments and is not to be construed as limiting thereof. Although a few exemplary embodiments have been described, those skilled in the art will readily appreciate that many modifications are possible without materially departing from the novel teachings and advantages. Accordingly, all such modifications are intended to be included within the scope of this inventive concept as defined in the claims. In the claims, means-plus-function clauses are intended to cover the structures described herein as performing the recited function, and not only structural equivalents but also equivalent structures.

What is claimed is:

1. An Ethernet for control automation technology (EtherCAT) control device, comprising at least one processor to implement:
    a master including a dummy EtherCAT slave controller (ESC); and
    a first slave and a second slave, each including an ESC and configured to communicate data with the master according to an EtherCAT protocol,
    wherein the master synchronizes a timing with the first slave according to a precision time protocol (PTP) method using the dummy ESC, and each of the first slave and the second slave synchronizes the timing with each other according to the PTP method using a corresponding ESC,
    wherein the first slave operates as a time master and the master operates as a time slave, and
    wherein the master, which synchronizes the timing with the first slave by correcting a time of the master, transfers an operational command to the first slave in synchronization with the timing of the first slave, and in response to the operational command, the first slave controls a first motor corresponding to a first axis of a robot and the second slave controls a second motor corresponding to a second axis of the robot.

2. The EtherCAT control device according to claim 1, wherein the first slave operates as the time master and the second slave operates as the time slave.

3. The EtherCAT control device according to claim 1, wherein the dummy ESC performs a drive preparation operation by itself,
    wherein the drive preparation operation includes an initializing operation, a safety operating operation, a pre-operating operation, and an operating operation.

4. The EtherCAT control device according to claim 3, wherein the master further comprises a digital signal processor (DSP) configured to execute the drive preparation operation of the dummy ESC.

5. The EtherCAT control device according to claim 1, wherein the master further comprises a central processing unit (CPU) operated according to an operating system,
    wherein the operating system does not include a Real-Time Operation System.

6. The EtherCAT control device according to claim 1, wherein the PTP method observes a protocol prescribed by Institute of Electrical and Electronics Engineers (IEEE) 1588.

7. The EtherCAT control device according to claim 1, wherein the master further includes a master clock generator configured to generate a master clock, and
    the master transfers the operational command in synchronization with the master clock to the first slave.

8. A factory automation system, comprising:
    a robot having a first motor mounted on a first axis and a second motor mounted on a second axis; and
    an Ethernet for control automation technology (EtherCAT) control device configured to control the robot,
    wherein the EtherCAT control device comprises:
    a master including a dummy EtherCAT save controller (ESC); and
    a first slave and a second slave, each including an ESC and configured to communicate data with the master according to an EtherCAT protocol,
    wherein the master synchronizes a timing with the first slave according to a precision time protocol (PTP) method using the dummy ESC, each of the first slave and the second slave synchronizes the timing with each other according to the PTP method using a corresponding ESC,
    wherein the first slave operates as a time master and the master operates as a time slave, and
    wherein the master, which synchronizes the timing with the first slave by correcting a time of the master, transfers a first operational command to the first slave and transfers a second operational command to the second slave in synchronization with the timing of the first slave, and the first slave controls the first motor in response to the first operational command and the second slave controls the second motor in response to the second operational command.

9. The factory automation system according to claim 8, wherein the first slave operates as the time master and the second slave operates as the time slave.

10. The factory automation system according to claim 8, wherein the master further comprises:
    a central processing unit (CPU) operated according to an operating system,
    wherein the operating system does not include a real-time operating system.

11. The factory automation system according to claim 8, wherein the dummy ESC performs a drive preparation operation, and the drive preparation operation
    includes an initializing operation, a safety operating operation, a pre-operating operation, and an operating operation.

12. A method of controlling an Ethernet for control automation technology (EtherCAT) control device, the method comprising:
    communicating data from a master, which includes a dummy EtherCAT slave controller (ESC), with a first slave and a second slave;
    synchronizing a timing of the master with the first slave according to a precision time protocol (PTP) method using the dummy ESC and
    synchronizing a timing of the second slave with the first slave according to the PTP method using ESCs of the first slave and the second slave,
    wherein the first slave operates as a time master and the master operates as a time slave, and
    wherein the master, which synchronizes the timing with the first slave by correcting a time of the master, transfers an operational command to the first slave in synchronization with the timing of the first slave, and in response to the operational command, the first slave controls a first motor corresponding to a first axis of a robot and the second slave controls a second motor corresponding to a second axis of the robot.

13. The method according to claim 12, wherein the communicating includes communicating data from the master to the second slave.

14. The method according to claim 12, further comprising:
    performing a drive preparation operation by the dummy ESC, wherein the drive preparation operation includes an initializing operation, a safety operating operation, a pre-operating operation, and an operating operation.

15. The method according to claim 12, further comprising:
    generating a master clock by the master, and
    transferring the operational command by the master from the first slave to the second slave in synchronization with the master clock.

* * * * *